United States Patent
Desjardins

(10) Patent No.: US 8,395,511 B2
(45) Date of Patent: *Mar. 12, 2013

(54) REMINDER DEVICE FOR ELICITING BEHAVIORAL RESPONSE IN A VEHICLE

(75) Inventor: Carole Desjardins, Hudson (CA)

(73) Assignee: Les Innovations CD Invenio Inc., Hudson, Quebec (CA)

( * ) Notice: Subject to any disclaimer, the term of this patent is extended or adjusted under 35 U.S.C. 154(b) by 431 days.

This patent is subject to a terminal disclaimer.

(21) Appl. No.: 12/677,993

(22) PCT Filed: Sep. 12, 2008

(86) PCT No.: PCT/CA2008/001626
§ 371 (c)(1),
(2), (4) Date: Mar. 12, 2010

(87) PCT Pub. No.: WO2009/033292
PCT Pub. Date: Mar. 19, 2009

(65) Prior Publication Data
US 2010/0225487 A1    Sep. 9, 2010

Related U.S. Application Data

(63) Continuation of application No. 11/855,663, filed on Sep. 14, 2007, now Pat. No. 7,966,109.

(30) Foreign Application Priority Data

Feb. 21, 2008   (CA) ..................................... 2622497

(51) Int. Cl.
*G08B 23/00*   (2006.01)

(52) U.S. Cl. ..................... 340/573.1; 701/36; 340/457

(58) Field of Classification Search ............... 340/573.1, 340/438, 457, 473, 815.4; 701/36; 180/271–273
See application file for complete search history.

(56) References Cited

U.S. PATENT DOCUMENTS

| | | | |
|---|---|---|---|
| 4,236,479 A | 12/1980 | Walker et al. | |
| 4,973,106 A | 11/1990 | Strovinskas | |
| 5,656,994 A | 8/1997 | Heningen | |
| 5,949,340 A | 9/1999 | Rossi | |
| 6,409,271 B1 | 6/2002 | Caramanis | |
| 6,489,889 B1 * | 12/2002 | Smith | 340/457 |
| 6,535,137 B1 * | 3/2003 | Ryan | 340/573.1 |
| 6,714,132 B2 * | 3/2004 | Edwards et al. | 340/573.1 |
| 6,750,764 B1 | 6/2004 | Henninger | |
| 6,909,365 B2 | 6/2005 | Toles | |
| 6,922,147 B1 * | 7/2005 | Viksnins et al. | 340/573.1 |
| 6,930,614 B2 * | 8/2005 | Rackham et al. | 340/573.1 |
| 7,012,533 B2 * | 3/2006 | Younse | 340/573.1 |
| 7,097,226 B2 | 8/2006 | Bingle et al. | |
| 7,151,452 B2 | 12/2006 | Shieh | |
| 7,250,869 B2 * | 7/2007 | Davis | 340/573.1 |
| 7,457,695 B1 * | 11/2008 | Fields et al. | 701/36 |
| 7,966,109 B2 * | 6/2011 | Desjardins | 340/457 |
| 2005/0091892 A1 | 5/2005 | Dang | |
| 2006/0033634 A1 * | 2/2006 | Best | 340/666 |
| 2006/0139159 A1 * | 6/2006 | Lee et al. | 340/457 |
| 2006/0176183 A1 | 8/2006 | Jetton | |
| 2007/0220793 A1 | 9/2007 | Mappes | |

OTHER PUBLICATIONS

Babybeesafe.net Copyright © 2006.

* cited by examiner

*Primary Examiner* — John A Tweel, Jr.
(74) *Attorney, Agent, or Firm* — Leason Ellis LLP

(57) ABSTRACT

A reminder device for alerting or triggering the memory of a vehicular occupant includes one or more visual, auditory and tactile indicators which the occupant associates with the presence of a person, pet, plant or inanimate object located in the vehicle.

22 Claims, 4 Drawing Sheets

REMINDER DEVICE FOR ELICITING BEHAVIORAL RESPONSE IN A VEHICLE

FIELD OF THE INVENTION

This invention relates to devices that elicit a behavioral response in vehicular occupants to remind them that there is a person or object located in the vehicle. In particular, this invention discloses a device which uses at least one of the five senses to remind an occupant of the presence of a child, animal, plant or inanimate object in the vehicle.

BACKGROUND OF THE INVENTION

Learned Responses in a Vehicle

Driving has been described as a complex behavior that requires the extraction and integration of information from multiple sources so as to produce safe driving practices and efficient vehicle control.

Much of this information is processed visually by the driver, such as noticing a stop sign or a child walking on the road, which would normally result in the behavior of slowing down. Some of this information is audible, such as the ringing of a mobile telephone, which often results in answering a phone call, or the reminder alarm of an unfastened seat belt, which results in the individual securing the belt in place. Other information is tactile in nature, such as sensing a hot vehicle, which may result in opening the window or activating the air conditioning system.

Drivers often learn to adapt to various stimuli by responding in an appropriate manner. If for example the radio volume is loud and a mobile phone rings, one reaction is to turn down the volume. Over time, this learned behavior can become second nature to the driver such that minimal effort or thought is exerted in order to respond appropriately to the stimuli.

Drivers and other vehicular occupants learn to respond appropriately to various stimuli while in the vehicle, such that when a similar stimulus is encountered on subsequent occasions, the person responds in a manner which is consistent with the desired outcome. After a few experiences with similar stimuli, there is little or no concentrated thought deliberately exerted by the person since the person is now "trained" to respond in the appropriate manner.

One example is the action of turning right by the driver. Prior to the turn, the driver typically slows down, actuates the turn signal, stops (if required), ensures a right turn can be safely made and is in accordance with the law, then accelerates while turning the steering wheel to the right. Having practiced turning on a few occasions, most drivers do not focus on the steps of turning since the learned response of turning right in a vehicle has become second nature.

Driving Distractions

Studies have shown that a change to the driver's visual, audible or tactile behavior could have a significant impact on vehicle safety. Miura (1990, "Active function and useful field of view in a realistic setting," in From Eye to Mind. Information Acquisition in Perception, Search and Reading. Amsterdam: North-Holland), for example, demonstrated that visual search patterns may be influenced by environmental complexity, such as the road scene.

With respect to the detrimental effects resulting from the experience of strong emotions, Janelle, Singer and Williams (1999, External distraction and attentional narrowing: Visual search evidence," *Journal of Sport and Exercise Psychology*, 21: 70-91) demonstrated in an auto racing simulation study, that at higher levels of anxiety, the identification of lights in the periphery became slower and less accurate.

When demanding cognitive tasks are carried out during driving, Parkes and Hooijmeiher (2000, "The influence of the use of mobile phones on driver situation awareness," Internet forum on driver distraction hosted by US DOT NHTSA, www-nrd.nhtsa.dot.gov/departments/nrd-13/driver-distraction/PDF/2.PDF) noted that drivers tend to react more slowly when an unexpected event occurs during a phone conversation, which was attributed to a reduction in situation awareness due to the high level of concentration required during the conversation.

As these and other studies show, vehicle drivers are challenged more and more to remain focused on safety and safe driving. Numerous devices in the vehicle, such as mobile phones, text messaging, electronic and traditional map reading and audio visual devices contribute to diverting the driver's attention from the road to the device.

In addition to distractions caused by in-vehicle devices, drivers often use their time while driving to mentally analyze, organize and prepare their day. Such mental processing can distract the driver from concentrating on road and vehicle safety.

Forgotten Passengers or Objects

Once drivers reach their destination or exit the vehicle, there is a danger that the various distractions during the drive may cause the driver to forget important information such as who or what is in the vehicle. Even if a driver is concentrating on road safety during the drive, it is possible that the driver forgets this type of important information when the vehicle reaches its destination. These otherwise forgotten people or objects are typically children in safety seats, but they also may be sleeping individuals, the elderly, pets, plants, valuable or perishable objects or inanimate objects that should not remain in the vehicle after the driver and other occupants exit. Every year, children who are secured in child safety seats are left in vehicles, usually inadvertently, by busy, distracted drivers and other vehicular occupants.

The Children's Exercise and Nutrition Centre at McMaster University in Hamilton, Ontario, Canada conducted a recent study on internal vehicle temperatures and the danger to children. Within twenty minutes, the air temperature in a previously air-conditioned small car exposed to the sun on a 35° C. day (95° F.) was found to exceed 50° C. (122° F.). Within forty minutes, the temperature increased to 65.5° C. (150° F.). Citing this research, the Canada Safety Council (www.safety-council.org/info/child/hotcar.html) has advised that, in the confined space of a car, temperatures can climb so rapidly that they overwhelm a child's ability to regulate his or her internal temperature.

Too often children and adults are distracted when they are in a vehicle and therefore tend to forget or ignore important safety concerns. Numerous reminder devices in vehicles have been developed primarily to ensure that vehicular occupants are safe. Such devices are meant to remind children and adults alike. In this manner, the frequent use of these reminder devices has been associated with changed behaviors as they cause the user to adopt safe practices while in the vehicle.

Certain patents disclose devices that encourage or remind children to attach a child restraint device, such as U.S. Pat. Nos. 4,973,106; 5,656,994; 6,409,271 and 6,750,764. The inventions disclosed therein encourage the children to fasten their seatbelt with the use of toy teaching aids.

Other patents disclose devices that remind the driver or passengers that a child is located in a child safety seat, which is typically situated in the back seat of the vehicle, outside the driver's primary field of vision. Such patents include U.S. Pat. Nos. 5,949,340; 6,909,365; 7,097,226 and 7,151,452. These sensing devices are complex to manufacture and rely on multiple electronic components, such as load sensors, and one or more controller during operation. In addition, these types of devices sense the occupant in the seat and sound an alarm when a condition is triggered, such as the ignition stopping.

Simple tools have been disclosed in the prior art with the goal of jogging the memory of drivers regarding the presence of a child located in the vehicle. The use of a ribbon or piece of wool attached to the vehicle steering wheel, mirror or vehicle door, for example, is neither reliable, nor specific enough to consistently trigger the desired memory. Given the everyday use of such simple reminder tools, their use as reminder devices in a vehicle can be easily misinterpreted and the association with the desired memory does not necessarily occur. These simple tools are prone to malfunction for their intended purpose and therefore fail to remind the occupant that someone or something is present in the vehicle. Furthermore, the size and shape of these prior art tools is not easily associated with the memory of a person or thing in the backseat or other location in a vehicle not within the driver's field of vision or immediate access.

Another device of the prior art which has the intent of jogging the driver's memory is the Baby Bee Safe™ device from OLGS, LLC of Sapulpa, Okla., USA. This device is described as a large tag with a clip which is to be attached to the driver's key ring or to a person after the child is placed in a safety seat. When the ignition is turned off the keys are retrieved from the ignition. The driver then sees and feels the device which triggers the memory to retrieve a child from the safety seat. For instances when the device is attached to an individual, the person should notice the tag upon exiting the vehicle, which then triggers the memory. The device as disclosed will not work if the key ring is not removed from the vehicle or if the user does not notice or feel the device. Keys on a key ring are often left in the vehicle's ignition in rural areas or in secured garages after the ignition is turned off. Many drivers also leave the ignition running, and then exit the vehicle, such as to make a quick trip to a convenience store. In addition, an individual may not notice the device is attached to the wearer's clothes, such as during the cold season when clothes tend to be more bulky. In these and other circumstances, the device will fail to remind the driver that a child is in the vehicle.

Given the many distractions that drivers and other vehicular occupants face during a typical drive, there remains a need for an effective, simple device that will elicit a specific behavioral response in the occupant by reminding the occupant that someone or something is located in the vehicle. Such a device must not distract a vehicular occupant during the operation of the vehicle or require a connection to sense whether the person or object is in the vehicle. Furthermore, such a device must always be noticed by the occupant when the occupant exits the vehicle.

SUMMARY OF THE INVENTION

The present invention overcomes the problems noted above. The device of the present invention reminds or alerts vehicular occupants that a person, plant, pet or inanimate object is located in the vehicle's backseat or other immediately inaccessible location so that the appropriate action may be taken to ensure their safety and security.

The driver or other vehicular occupant that uses the device of the present invention is referred to as the "user". The presence of the thing, plant, animal or person, the memory of which the device triggers in the user is referred to as the "vehicle's occupancy status".

During use, the device is attached to the vehicle. Unless otherwise specified, reference to the device being "attached" includes removable attachment and permanent attachment to an interior part of the vehicle which will always be noticed by the user.

In one aspect of the present invention, a device for reminding or warning a user of a vehicle's occupancy status is provided. The device is attached to the vehicle. A characteristic of the device triggers a memory in the user which reminds the user of the vehicle's occupancy status.

In another aspect of the present invention, the memory is triggered by the device when the user exits the vehicle.

In another aspect of the present invention, the characteristic of the device which triggers the desired memory is its visual appearance. The device's visual appearance includes its shape, size, colour, pattern, incandescence, luminescence or a photo fixed to or associated with the device.

In another aspect of the present invention, the characteristic of the device which triggers the desired memory is the device's tactile surface, such as the surface texture, device temperature in relation to its environment or movement of the device.

In another aspect of the present invention, the characteristic of the device which triggers the desired memory is an audible sound associated with the device. The sound can be an alarm or pre-recorded voice.

In another aspect of the present invention, the device can be removably attached to various locations in the vehicle. During use, the device can be attached to a location which is noticeable by the user, such as the interior door handle close to the user. When the device is not being used, such as when the backseat is vacant, the device may be placed in a second location in the backseat, such as on or near a child safety seat assembly.

Known means to removably attach the device to the door, door handle area or other suitable area in the vehicle can be employed such as two-sided tape, hook and loop fasteners (eg: VELCRO™), elastic bands, clips, wire, buttons, clasps, fabric and string or other known means of attachment. Another manner of attachment would be as a sliding sleeve, wherein the device slips over the end of the door handle, similar to a sock. Similarly, such known means can be used to attach the device to other surfaces, such as a child safety seat assembly when the device is not being used.

In another aspect of the present invention, the device is in integral or permanent attachment to or proximate to an interior door handle assembly in the vehicle.

In a further aspect of the present invention, a method of remembering a vehicle's occupancy status is provided, in which the steps are removably attaching a device proximate to or on an interior handle of a vehicle door prior to operating the vehicle; and noticing the device during or after operating the vehicle. The device is indicative of the vehicle's occupancy status.

In another aspect of the present invention, the method has the additional steps of removably detaching the device from the interior door handle and then removably attaching the device to a location proximate to or on a child safety seat assembly.

In another aspect of the present invention, a method of remembering a vehicle's occupancy status is provided, in which the steps are removably detaching a device from one location proximate to or on a child safety seat assembly, removably attaching the device to another location proximate to or on an interior handle of a vehicle door and then noticing the device.

In another aspect of the present invention, a method of remembering a vehicle's occupancy status is provided, in which the steps are activating a switch which is indicative of the occupancy status, generating an audible alarm when a condition occurs and deactivating the switch to silence the alarm.

In another aspect of the present invention, the condition can be the vehicle door opening and the vehicle ignition turning off.

BRIEF DESCRIPTION OF THE DRAWINGS

FIG. 1a) illustrates the front view, which is noticed by the user. FIG. 1b) illustrates the rear view, with attachment means for the removable attachment of the device.

DETAILED DESCRIPTION OF THE EMBODIMENTS

The invention will be described with reference to the figures and accompanying text. The figures are illustrative and are not intended to limit the scope of the invention, as described.

The invention is a memory aid tool which is used to elicit or trigger a learned response. The specific response that the invention teaches is to trigger the memory that something or someone is in the back seat of the vehicle.

The reminder device of the present invention is attached to a location in the vehicle such that the user will notice the device when exiting the vehicle such as on or proximate the door closest to the user. In accordance with the invention, when the user becomes aware of the device, the user associates the device with the memory that someone or something is in the vehicle and can thereafter take any appropriate action, as required. The device can be positioned in a suitable location so that when the door is opened from the inside, the device is noticed.

Memories are triggered using the senses. One or more indicators or characteristics can be associated with the invention in order to evoke the desired memory in the user that a person or thing is located in the vehicle and may require removal. In this manner, the device "reminds" the user about the occupancy status of the vehicle since the user's memory is triggered as described herein. The device can also be said to "warn" or "alert" the user about the vehicle's occupancy status when the user observes, hears and/or feels the device. It is possible that the warning or alert may occur at any time when the device of the present invention is in use, such as when the user's hand inadvertently brushes up against the device. Preferably, the warning or alert occurs just prior to or while the user exits the vehicle.

In one embodiment, the device is noticed visually when the user sees the device. The visual recognition of the device serves as a partial or total reminder or alert that someone or something is in the vehicle and may have to be removed. In this regard, the device may be of any suitable shape, size, colour and pattern. Preferably the visual characteristics of the device are not distracting to the user during operation of the vehicle.

Figure 1:
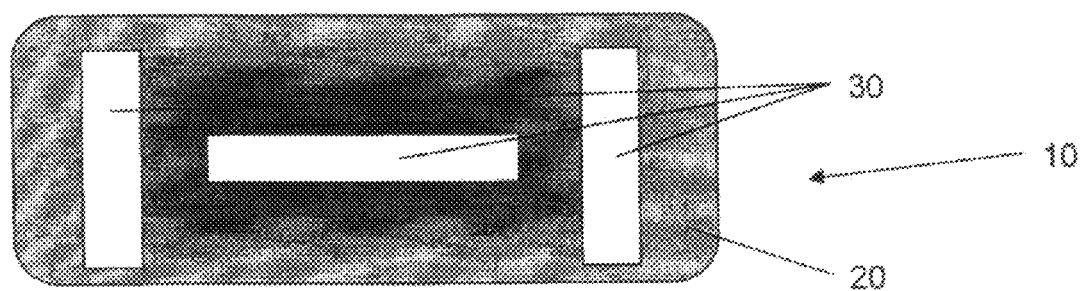
FIG. 1 illustrates two views of an embodiment of the device of the present invention.
Figure 1:
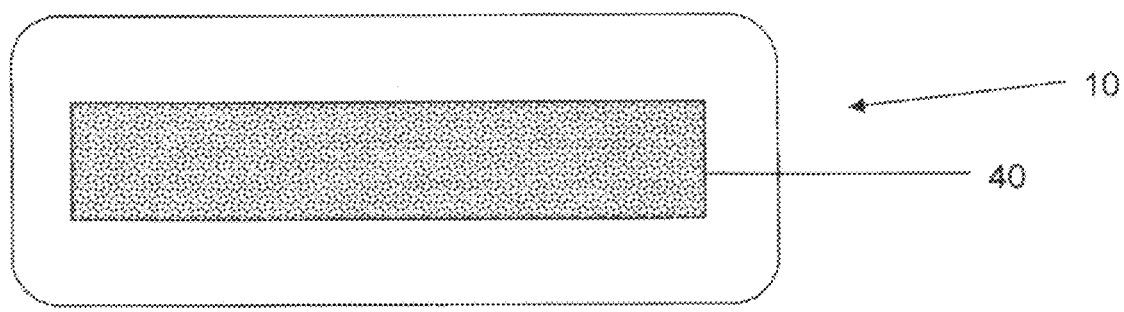

Various visual means can be used to render the device conspicuous. A unique pattern on the device which visibly makes it stand out from its surroundings is one way that the device can be made visually conspicuous. One such pattern is illustrated in FIG. 1a). Patterns can be also chosen to suit the user's individual style or to complement colour schemes, so long as the pattern acts a visual indicator of the device.

FIGS. 1a) and 1b) illustrate an embodiment of the device of the present invention. FIG. 1a) shows the device 10 which is of a particular shape. While the illustration depicts a general rectangular shape, other suitable shapes are contemplated. The device 10 has one or more characteristics which trigger the memory of the user when the device is noticed. In the embodiment illustrated at FIG. 1a), the device 10 incorporates two visual indicators, a distinguishable pattern 20 and reflective tape 30 on its surface, to render the device 10 conspicuous. In this illustration, there are three pieces of reflective tape 30. The number, size and positioning of reflective tape may vary, so long as the device serves as a visual indicator to alert the user.

Figure 3:
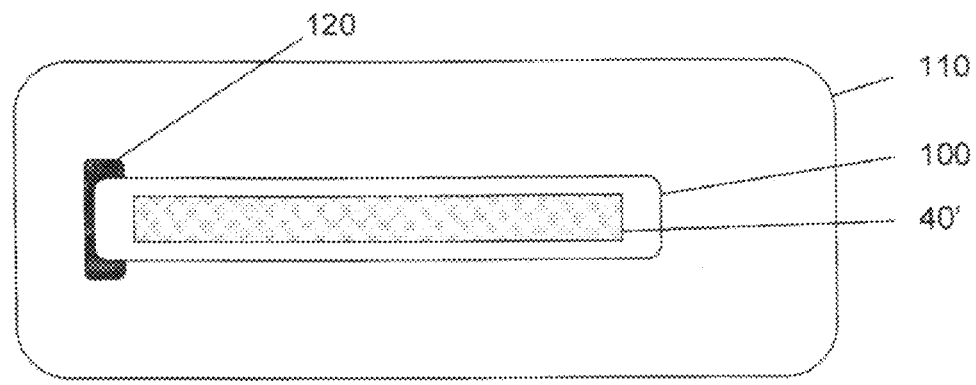
FIG. 3 illustrates a vehicle's interior door handle with attachment means for the removable attachment of an embodiment of the device of the present invention.

FIG. 1b) depicts a rear view of part of the device 10 which has attachment means to attach the device 10 to one or more locations in a vehicle. In the illustrated embodiment, the loop component 40 of a standard hook and loop fastener, such as VELCRO™, is attached to the back side of the device 10 with known means such as two-sided tape (not shown). In one embodiment, the corresponding hook component 40' is attached to part of the vehicle, as depicted in FIG. 3 and the child seat assembly of FIG. 5, discussed below. In another embodiment (not shown), a hook component is attached to the device 10 and a corresponding loop component is attached to a part of the vehicle. A hook and loop attachment means 40, 40' allows for the device to be removably attached and detached from more than one location.

Figure 2:
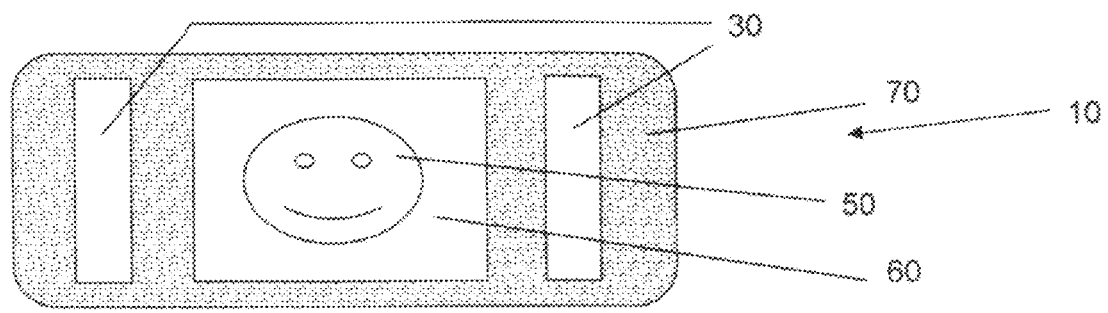
FIG. 2a) illustrates an embodiment of the device of the present invention which incorporates a photo as a visual indicator and a textured surface as a tactile indicator.
FIG. 2b) illustrates an embodiment of the device of the present invention which incorporates lighting as a visual indicator and audio speakers as and an auditory indicator.
Figure 2:
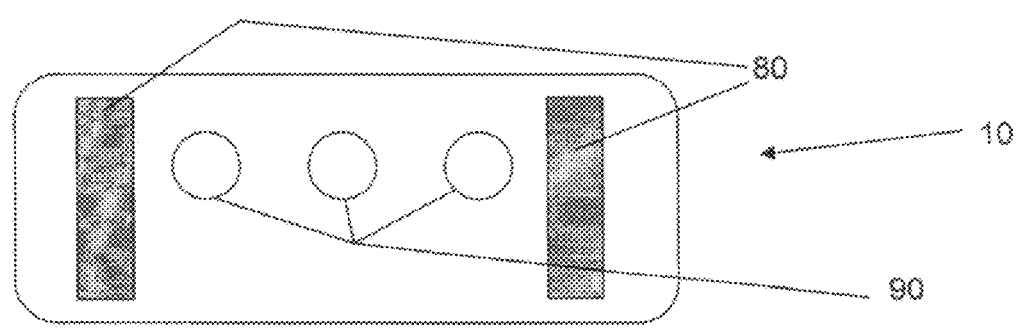

Pictures, photos and/or symbols which are fixed to or associated with the device, such as in a transparent sleeve or window, within the user's field of visibility and that are recognizable to the user, such as a photo of the user's child, are another way the device can be noticed or recognized with visual means. An embodiment of the device incorporating a photograph is illustrated in FIG. 2a). The photo 50 is removably fixed in place by sliding the photo 50 between the surface of the device 10 and a transparent sleeve 60 which is attached to the device. The embodiment illustrated in FIG. 2a) also incorporates reflective tape 30 as a visual indicator and a textured surface 70 as a tactile indicator. In this illustration, there are two pieces of reflective tape 30.

The device of the present invention can be constructed with one or more suitable materials including textile, cardboard, plastic and metal. In one embodiment, the surface of the device which is visible to the user is covered with a fabric having an irregular pattern which renders it visually noticeable when the device is located near or on a door handle. In another embodiment, the entire device surface is covered with a textile.

Various textiles are contemplated for the invention, including those with different patterns, different textures (further discussed below) and different reflective characteristics. One way to make the surface of the device reflective is to incorporate glass, plastic, metallic beads or other reflective materials in its construction. Another way is to coat or paint part of or the entire device surface with reflective paint. Still another way is to attach one or more reflective markers to the device surface, such as reflective tape, in order to render the device conspicuous.

Various types of incandescent or luminescent lighting attached or proximate to the device, such as embedded constant or variable intensity LED lighting, is another way to render the device of the present invention noticeable, particularly in minimal or reduced general lighting conditions. One embodiment of the device using lighting as a visual indicator is illustrated in FIG. 2b). The illustrated lighting components 90 are controlled by a controller (not shown) and can illuminate together or separately, so long as the illumination renders the device conspicuous.

In another embodiment, the reminder device of the present invention can be positioned in a suitable location so that when the door is opened from the inside, the device is touched by the user. The tactile pattern recognition of the device serves as a reminder or alert that someone or something is in the vehicle and may have to be removed.

A textured device surface, such as an undulated or rough fabric pattern, which is different than the device's surrounding environment, encourages tactile recognition in the user. One embodiment of the device using a textured surface as a tactile indicator is illustrated in FIG. 2a). The illustrated textured surface 70 makes the device conspicuous when touched by the user.

A difference in temperature between the device surface and the user's hand temperature, is another way that the sense of touch triggers the desired memory. This is accomplished by incorporating a heating or cooling element within or associated with the device.

Yet another way to evoke the memory using tactile means is for the device to be moving, such as by a vibrating stimulus like a vibratory motor, embedded within the device (not shown).

In another embodiment, the reminder device of the present invention can be positioned in a suitable location so that when the door is opened from the inside, the device makes an audible sound which is heard by the user. The audible recognition of the device serves as a reminder that someone or something is in the vehicle and may have to be removed. One embodiment of the device incorporating speakers and a sound generating apparatus as an auditory indicator is illustrated in FIG. 2b). The one or more speakers 80 may be configured in any suitable manner to work in association with the sound generating apparatus (not shown).

As illustrated, a sound generating apparatus and speaker assembly, known to the skilled worker, can be incorporated into or attached to the device of the present invention. The apparatus can be actuated when the device is immobile or when the vehicle door is opened, such as by using an accelerometer connected to a circuit. When the engine is turned off or the door is subjected to relative angular movement when opened, the sound notification apparatus is actuated. The sound can be any type of alarm such as a standard ring notification or pre-recorded voice message. The volume of the generated sound must be sufficient to be heard by the user. The sound remains active for a pre-determined length of time or until it is manually turned off, such as by pressing a button. In a preferred embodiment, the generated sound is consistent such that the user quickly learns to recognize its meaning, associates the sound to the specific memory and thereby can react accordingly.

In yet another embodiment, combinations of visual, tactile and/or audible indications can be used to render the device of the present invention conspicuous. Illustrative examples include the device of FIG. 2 a) which employs visual and tactile indicators and the device of FIG. 2b) which employs visual and auditory indicators. In another example, not shown, when the device is touched or squeezed by the user, an internal actuator which is responsive to the user's touch, may be triggered to activate lighting, produce an audible tone and/or start internal vibratory movement.

The device of the present invention must be placed in a conspicuous area. There are several locations in the vehicle within proximity of the user where the user will notice the device. The rearview mirror, dashboard and front windshield may all be appropriate locations, so long as the device triggers the requisite memory in the user.

In order to minimize the chance of device recognition fatigue, a location proximate to or on the door handle has been shown to function with excellent results. The user exits the vehicle by often looking at, but usually always touching, the door handle. When the device of the present invention covers the large part or all of the door handle, it becomes a part of the door opening process. The associated memory of a person or object in the back seat has been found to always be triggered when the device is attached to or proximate to the door handle. FIG. 3 illustrates an area on the interior door handle 100 of a vehicle within the handle housing 110 in which an embodiment of the device of the present invention can be removably attached. The illustrated door handle 100 pivots on a handle hinge 120 when opened.

Other shapes and configurations of vehicle door handles may not allow sufficient space to incorporate the device of the present invention. In such a case, the device can be attached to an area proximate to or on the door handle housing.

As shown in FIG. 3, the hook component 40' of a hook and loop fastener is attached to the door handle 100, such as with two-sided tape (not shown), in such a manner that the device 10 can be removably attached thereto with the corresponding loop component 40.

In one embodiment, the device can be fixedly attached to the door's interior handle or adjacent to the door handle. In this manner, every time the user opens the door to exit the vehicle, the device is noticed, thereby evoking the desired memory. The device can be adapted to work with any type of vehicle door handle, including with doors that comprise more than one handle.

Preferably, the device is removably attached to the door handle or adjacent to the door handle, typically by the user, when the user enters the vehicle. For example, if the user is securing a child in the backseat of the vehicle, prior to entering the vehicle's front area, the user removably attaches the device of the present invention in a suitable location so as to render the device conspicuous. Upon exiting the vehicle, both the device and the child may be removed from the vehicle. The device may then be removably attached to another part of the vehicle, such as on or near a child safety seat, further discussed below, where it may remain until a child is placed in the vehicle again.

In one embodiment, when the device of the present invention is not being used by the user, it can be removably attached to a convenient area in the back seat area of the vehicle, such as in a conspicuous location on or proximate to a child safety seat assembly. The child safety seat and its assembly described herein is to be understood in a broad sense and therefore includes seats, related seat cushions, booster seats and their assemblies for use by babies, toddlers and children. In this embodiment, the user would use the invention typically when the child safety seat is being used by a child. Before or after the child is secured in the safety seat, the device of the present invention is removably detached from the safety seat and removably attached to the area of use, such as on the internal handle of the driver side door.

In another embodiment, the door handle can be constructed to allow the easy fixed or removable attachment or incorporation of the device of the present invention.

Figure 4:
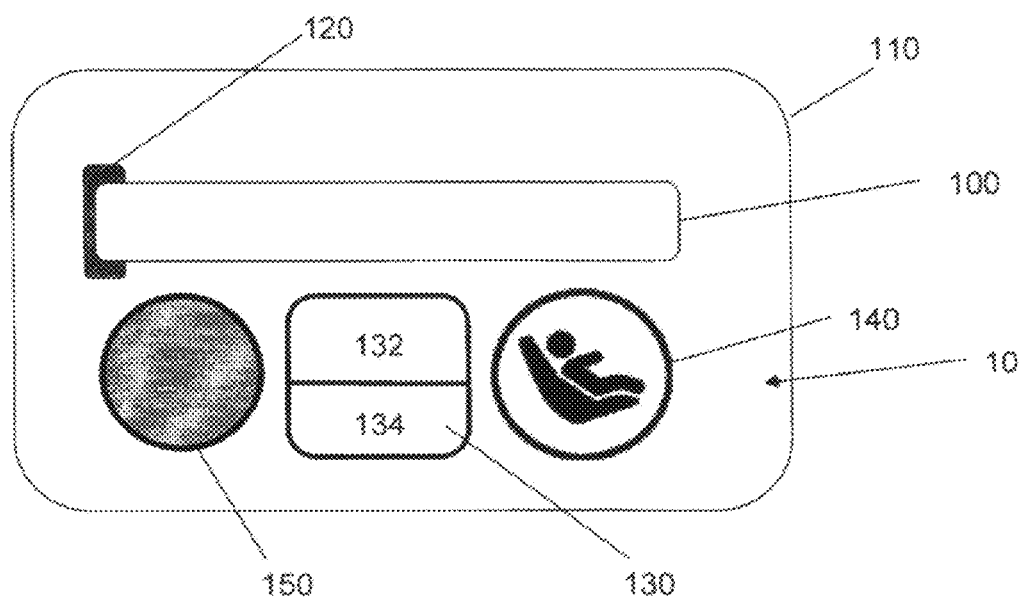
FIG. 4 illustrates an embodiment of the device of the present invention which is fixed or integrated to a door handle assembly.

An embodiment of the device on the present invention which forms part of the door handle assembly is illustrated in FIG. 4. For the fixed or integral attachment to or proximate to the door handle housing 110, one embodiment of the invention incorporates a switch 130 indicating the presence 132 or absence 134 of a passenger or object situated in the backseat or other immediately inaccessible location. When the driver enters the vehicle, he or she activates the switch 130 to indicate that someone or something is present in the back seat. Once activated, the device 10 becomes operational. In one embodiment, a suitable icon 140 is illuminated to indicate its operational status. The icon 140 may be located in the instrumentation area of the vehicle or proximate the device 10, as illustrated. The icon 140 may comprise one or more words, symbols, colours, lighting states or a combination of these elements. The switch itself 130 may be illuminated when the device is in operational mode. When a condition occurs such as opening the door, an audible warning alarm is actuated through a speaker 150, to remind or alert the user of the presence of a passenger or object. In one embodiment, the condition is turning off the ignition. The alarm continues to sound until the switch 130 is disabled, thereby deactivating the device 10.

The embodiment illustrated FIG. 4 shows an icon 140 which is indicative of a child in a child safety seat. This icon can be replaced with a generic symbol indicative of another person, such as an elderly passenger, pet, plant, or object or with a general symbol representing any of these, for which the user's memory needs to be triggered in accordance with the present invention.

Figure 5:
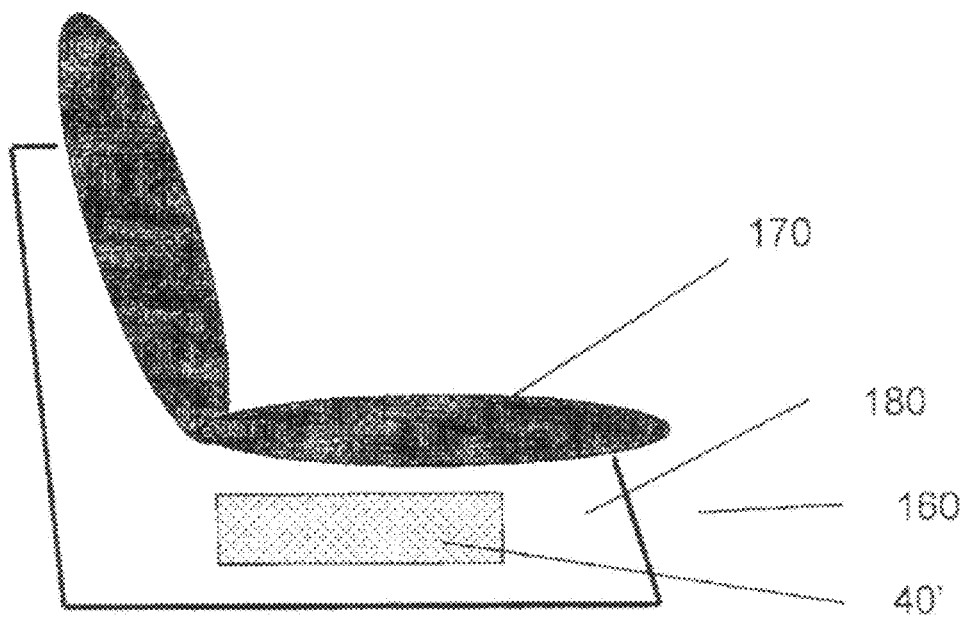
FIG. 5 illustrates a child safety seat assembly which allows for the easy removable attachment and detachment of the device of the present invention.

The device of the present invention is of particular importance to parents with children who require the use of a child safety seat. In yet another embodiment, a child safety seat assembly 160, which houses a child safety seat 170, is depicted to show the easy removable attachment of the device 10, as illustrated in FIG. 5. The term "child safety seat assembly" as used herein is meant to include any part of the child safety seat 170, the base 180 or other peripherals (not shown), such as the child seat safety straps. The embodiment in FIG. 5 depicts a location for attaching the device 10 on the base 180 of the child safety seat assembly 160. Preferably the removable attachment means are situated in an area of the assembly which is conspicuous when a child is placed in the safety seat so that the user will understand that the device is to be detached from the safety seat prior to driving the vehicle.

In one embodiment, during use with the safety seat assembly 160, the device 10 is removably attached to the safety seat assembly 160, such as with a hook component 40' of a hook and loop fastener attachment. When or after the child is secured in the safety seat 170, the device 10 is removably detached from the hook component 40', and attached to a location in the vehicle near the user, such as on the corresponding loop component 40 of the attachment, located on or proximate to an interior door handle 100.

When the user exits the vehicle, whether or not the vehicle's ignition is turned off, the device 10 is noticed by the user in accordance with the invention. Once alerted, the user removably detaches the device 10 from the location near the user and re-attaches the device 10 to the hook component 40' on or proximate to the safety seat assembly 160.

In a further embodiment of the present invention, the user is prompted by an audible or visual indicator or signal at or shortly after entry into the vehicle to trigger the user's Memory to activate the reminder device. For example, a visual text or graphic prompt such as "Child in Vehicle?" or "Valuables in Vehicle?" may display on the instrument panel. Alternatively or in addition, a pre-recorded voice prompt or chime may sound. In response to the prompt(s), if appropriate, the user activates the reminder device, as described above. This embodiment may be triggered when one or more vehicle doors, such as the driver door, are opened.

The user that employs the device of the present invention necessarily will associate the desired memory with the invention. Over time, much like learning to respond to various stimuli encountered during the operation of the vehicle, the user learns how to respond appropriately to noticing the device of the present invention. An appropriate response when there is a child in the backseat is to safely remove the child from the vehicle.

The invention claimed is:

1. A device for reminding or warning a user of a vehicle's occupancy status, wherein:
    said device is integral with said vehicle and remote from said user,
    said device is non-distracting during operation of said vehicle, and
    one or more characteristics associated with said device are capable of triggering a memory in said user of said occupancy status only upon the occurrence of a condition;
wherein said condition is selected from the group consisting of a door of said vehicle opening and the ignition of said vehicle turning off.

2. The device of claim 1, wherein said occupancy status is indicative of the presence of a person, animal, plant or inanimate object in said vehicle.

3. The device of claim 1, wherein said device is located in close proximity to said user.

4. The device of claim 1, wherein said device is in integral or permanent attachment to or proximate to an interior door handle assembly of said vehicle.

5. The device of claim 1, wherein said device is not noticeable by said user during operation of said vehicle.

6. The device of claim 1, wherein said device is noticeable by said user upon exiting said vehicle.

7. The device of claim 1, wherein said one or more characteristics are selected from the group consisting of visual appearance, tactile surface and audible sound.

8. The device of claim 7, wherein said visual appearance characteristic is selected from the group consisting of shape, size, color, pattern, incandescence, luminescence and a photo fixed to or associated with the device.

9. The device of claim 7, wherein said tactile surface characteristid is selected from the group consisting of texture, shape, temperature, vibration and other movement of said device.

10. The device of claim 7, wherein said audible sound characteristic is selected from the group consisting of an alarm, chime, standard ring notification and pre-recorded voice.

11. The device of claim 7, wherein said visual appearance characteristic is on an instrumentation area of said vehicle.

12. The device of claim 7, wherein said audible sound characteristic is from audio speakers.

13. The device of claim 1, further comprising a switch wherein said switch is activated by said user to indicate said occupancy status prior to operation of said vehicle.

14. The device of claim 13, wherein said device prompts said user to activate said switch.

15. A method of remembering a vehicle's occupancy status, comprising:
   a) activating a remote device that is integrally attached to a vehicle;
   b) operating said vehicle without being distracted by said device; and
   c) noticing said device upon the occurrence of at least one condition selected from the group consisting of a door of said vehicle opening and the ignition of said vehicle turning off,
wherein said device is indicative of said vehicle's occupancy status.

16. The method of claim 15, further comprising the step of prompting a user with one or more visual or audible signals for confirmation about said occupancy status prior to step a).

17. The method of claim 15, wherein the device is located in close proximity to said user.

18. The method of claim 15, wherein the device is in integral or permanent attachment to or proximate to an interior door handle assembly of said vehicle.

19. A method of remembering a vehicle's occupancy status, comprising:
   a) activating a remote switch that is integrally attached to a vehicle, wherein said switch is indicative of said occupancy status;
   b) generating an alarm on the occurrence of a condition; and
   c) deactivating said switch to silence said alarm,
wherein said switch is connected to said alarm, and said condition is selected from the group consisting of a door of said vehicle opening and the ignition of said vehicle turning off.

20. The method of claim 19, further comprising the step of prompting a user with one or more visual or audible signals for confirmation about said occupancy status prior to step a).

21. The method of claim 19, wherein the device is located in close proximity to said user.

22. The method of claim 19, wherein the device is in integral or permanent attachment to or proximate to an interior door handle assembly of said vehicle.

* * * * *